US007839817B2

United States Patent
Wang et al.

(10) Patent No.: US 7,839,817 B2
(45) Date of Patent: Nov. 23, 2010

(54) APPARATUS FOR DETECTING UPLINK RANGING CODES IN A WIRELESS COMMUNICATION SYSTEM

(75) Inventors: Genyuan Wang, Plano, TX (US); Hang Jin, Plano, TX (US); Mansoor Ahmed, Hurst, TX (US); Daniel Wee, Garland, TX (US)

(73) Assignee: Cisco Technology, Inc., San Jose, CA (US)

( * ) Notice: Subject to any disclaimer, the term of this patent is extended or adjusted under 35 U.S.C. 154(b) by 898 days.

(21) Appl. No.: 11/711,201

(22) Filed: Feb. 26, 2007

(65) Prior Publication Data
US 2008/0097727 A1    Apr. 24, 2008

Related U.S. Application Data

(60) Provisional application No. 60/853,861, filed on Oct. 24, 2006.

(51) Int. Cl.
*H04W 4/00* (2009.01)
*H04B 7/216* (2006.01)
(52) U.S. Cl. ........................... 370/328; 370/342
(58) Field of Classification Search ................ 370/328, 370/310.2, 203, 210, 430, 208–209, 514–515, 370/342; 455/560–561; 375/142, 150, 152, 375/260, 343
See application file for complete search history.

(56) References Cited

U.S. PATENT DOCUMENTS

| | | | |
|---|---|---|---|
| 5,920,278 A | 7/1999 | Tyler et al. | |
| 6,154,486 A | 11/2000 | Scott et al. | |
| 6,567,482 B1 | 5/2003 | Popovic | |
| 6,631,166 B1 | 10/2003 | Carroll | |
| 7,336,647 B2 * | 2/2008 | Muharemovic et al. | 370/350 |
| 7,564,909 B2 * | 7/2009 | Sung et al. | 375/260 |
| 2002/0126803 A1 | 9/2002 | Jones et al. | |
| 2005/0030931 A1 * | 2/2005 | Sung et al. | 370/342 |
| 2005/0195791 A1 * | 9/2005 | Sung et al. | 370/342 |
| 2006/0083160 A1 * | 4/2006 | Koo et al. | 370/208 |
| 2007/0053465 A1 * | 3/2007 | Koo et al. | 375/303 |
| 2007/0076589 A1 * | 4/2007 | Stopler et al. | 370/210 |

OTHER PUBLICATIONS

PCT International Search Report and Written Opinion of the International Searching Authority, Dec. 20, 2007.

* cited by examiner

*Primary Examiner*—George Eng
*Assistant Examiner*—Brandon J Miller

(57) ABSTRACT

An apparatus for detecting uplink ranging codes includes a first transform unit for transforming data received from a mobile station to generate first outputs; a cross-correlation unit for comparing the first outputs with possible ranging codes to generate second outputs; a screening unit for selectively passing the second outputs representing parts of the received data that match the possible ranging codes; a second transform unit for transforming the second outputs from the screening unit to generate third outputs; and a detection unit for detecting the ranging codes for the received data based on the third outputs.

20 Claims, 4 Drawing Sheets

APPARATUS FOR DETECTING UPLINK RANGING CODES IN A WIRELESS COMMUNICATION SYSTEM

CROSS REFERENCE

The present application claims the benefit of U.S. Provisional Application Ser. No. 60/853,861, which was filed on Oct. 24, 2006.

BACKGROUND

The present invention relates generally to wireless telecommunication technology, and more particularly to an apparatus for detecting uplink ranging codes in a wireless communication system.

A wireless communication system is typically consisted of a number of base stations deployed among geographical areas for transmitting and receiving signals to and from a plurality of mobile stations. The mobile station receives downlink messages from the base station, and then transmits a set of uplink ranging codes to the base station through a ranging channel, typically a distributed sub-radio channel, in order to establish a link there between. The ranging code is a particular set pseudo-random code for the purpose of power adjustment information, bandwidth requirement, and time and frequency offsets between the signal timing of the mobile station and a reference point predetermined by the base station. Since in a wireless communication system, a base station may communicate with a plurality of mobile stations at the same time, it is common that the base station may receive various sets of ranging codes simultaneously from various mobile stations seeking to establish communication links.

When a base station receives data from a mobile station via uplink channels, it needs to extract ranging codes from them in order to determine information, such as time/frequency offsets and power adjustment information. Conventionally, the base station would compare the received data with an entire ranging code book, a set of sequences from which ranging codes are selected, to identify the ranging codes transmitted from the mobile station for further estimation of time/frequency offsets and power adjustment information.

FIG. 1 illustrates a block diagram showing a conventional apparatus 100 implemented in a base station for detecting uplink ranging codes carried by data received from one or more mobile stations. Each block in the drawing represents one or more particular functions that may be performed through hardware or software implementations. A Fast Fourier Transform (FFT) unit 102 transforms the data received from the mobile station with the FFT algorithm. A cross-correlation unit 104 receives outputs from the FFT unit 102 and possible ranging codes from a ranging code book to determine the correlation there between. An Inverse Fast Fourier Transform (IFFT) unit 106 receives outputs from the cross-correlation unit 104 and transforms them with the IFFT algorithm. A ranging code detection and time offset estimation unit 108 receives outputs from the IFFT unit 106 to detect the ranging codes of the received data, and estimate time offset from the detected ranging codes.

One drawback of the conventional apparatus is that its data processing is complex and resource-consuming when the ranging code book contains a large number of ranging codes, since all the outputs from the cross-correlation unit 104 must be processed by the IFFT unit 106. Another drawback is that the conventional apparatus may not be able to estimate time offset accurately. In the prior art, the time offset is estimated by the highest peak location of the received data signal in a process domain. Because the ranging channel is a distributed sub-radio channel, several peaks would appear on the time line in the process domain. Ideally, the location of the highest (the middle) peak represents the time offset. However, in reality, the location of the highest peak may be away from its noise-free location, especially in a low over-sampling environment. As a result, the time offset estimated by the highest peak position may not represent the true time offset accurately.

Thus, what is needed is an apparatus for detecting uplink ranging codes that balances data processing complexity and reduces inaccuracy in estimating time offsets.

SUMMARY

The present invention discloses an apparatus for detecting uplink ranging codes. In one embodiment of the present invention, the apparatus includes, but not being limited to, a first transform unit for transforming data received from a mobile station to generate first outputs; a cross-correlation unit for comparing the first outputs with possible ranging codes to generate second outputs; a screening unit for selectively passing the second outputs representing parts of the received data that match the possible ranging codes; a second transform unit for transforming the second outputs from the screening unit to generate third outputs; and a detection unit for detecting the ranging codes for the received data based on the third outputs.

The construction and method of operation of the invention, however, together with additional objectives and advantages thereof will be best understood from the following description of specific embodiments when read in connection with the accompanying drawings.

DESCRIPTION

This invention is directed to an apparatus for detecting uplink ranging codes in a wireless communication system. The following merely illustrates various embodiments of the present invention for purposes of explaining the principles thereof. It is understood that those skilled in the art will be able to devise various equivalents that, although not explicitly described herein, embody the principles of this invention.

Figure 1:
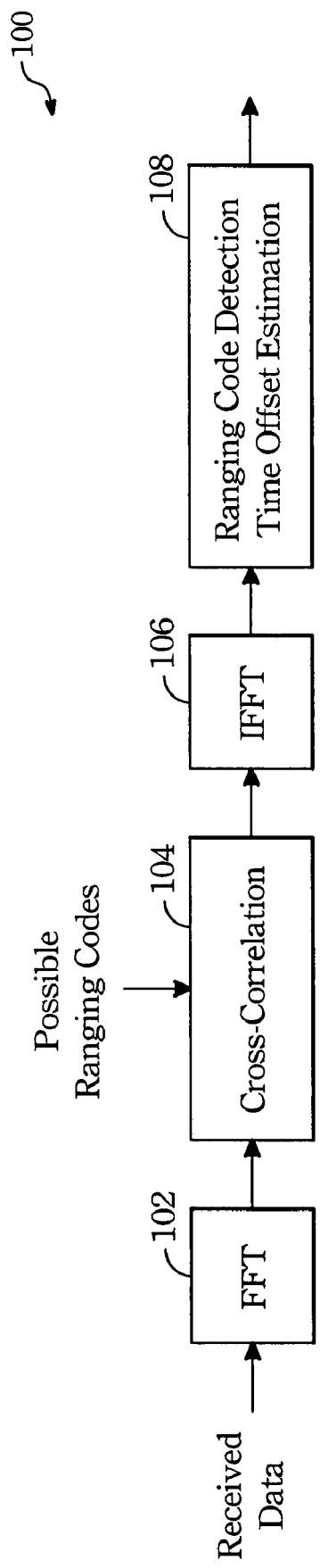
FIG. 1 illustrates a block diagram showing a conventional apparatus for detecting uplink ranging codes.
Figure 2:
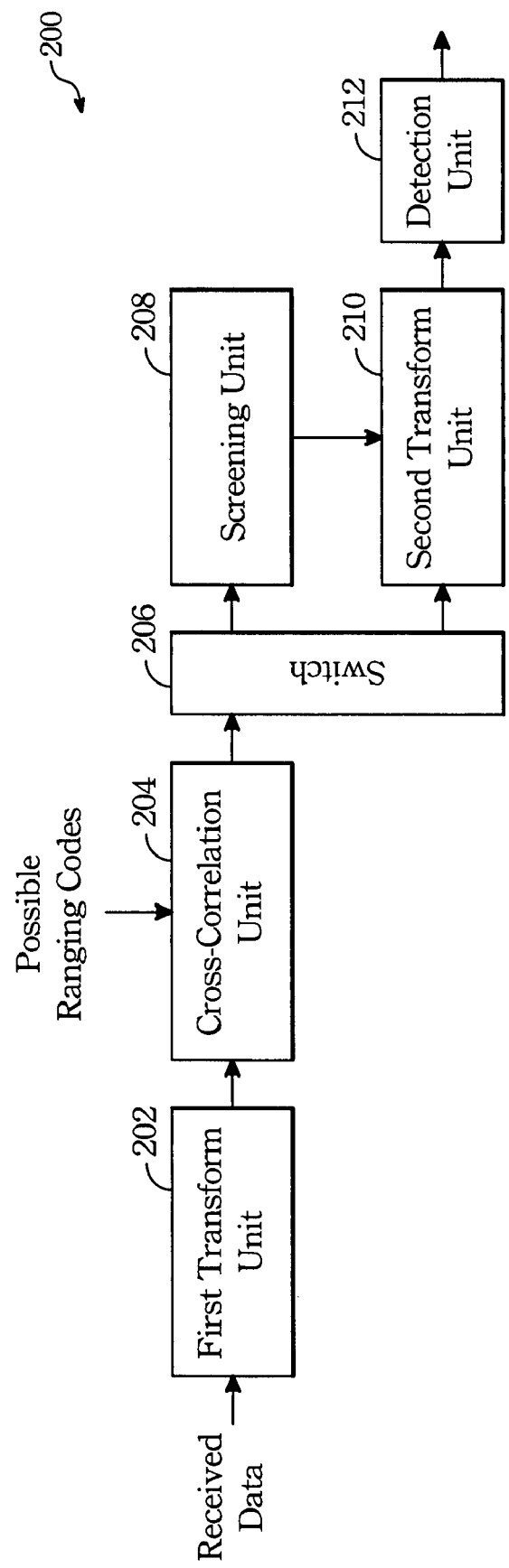
FIG. 2 illustrates a block diagram showing an apparatus for detecting uplink ranging codes in accordance with one embodiment of the present invention.

FIG. 2 illustrates a block diagram showing an apparatus 200 implemented in a base station for detecting uplink ranging codes transmitted by one or more mobile stations in accordance with one embodiment of the present invention. The apparatus 200 includes, but not being limited to, a first transform unit 202, a cross-correlation unit 204, a switch 206, a screening unit 208, a second transform unit 210, and a detection unit 212. The first transform unit 202 receives data from a mobile station, and transforms the data from one domain to another using a mathematical algorithm, such as FFT. The cross-correlation unit 204 receives the transformed data outputs from the first transform unit 202, and compares them with possible ranging codes from a ranging code book of the base station to determine whether parts of the data received from the mobile station match the code sequences compiled in the ranging code book for further estimation of information, such as time and frequency offsets, power adjustments, and bandwidth requirements.

The switch 206 receives outputs from the cross-correlation unit 204, and selectively passes the outputs to the screening unit 208 or the second transform unit 210, depending on whether one or more predetermined criteria are met. For example, if the size of the ranging code book is smaller than a predetermined value, the switch 206 will pass the outputs from the cross-correlation unit 204 to the second transform unit 210 bypassing the screening unit 208; if the size of the ranging code book is larger than the predetermined value, the switch 206 will pass the outputs to the screening unit 208 for identifying parts of the received data that match the potential ranging codes, thereby reducing the number of tasks that must be processed by the second transform unit 210—the operation of the screening unit 208 will be described in further detail in following paragraphs. As another example, if the number of the detected ranging codes generated by the detection unit 212 is smaller than a predetermined threshold, the switch 206 will pass the outputs from the cross-correlation unit 204 to the screening unit 208. However, if the number of the detected ranging codes is larger than the predetermined threshold, the switch 206 will forward the outputs from the cross-correlation unit 206 to the second transform unit 210, bypassing the screen unit 208. The scenario in which the switch 206 passes outputs from the cross-correlation unit 204 to the screening unit 208 is referred to as a sub-optimal mode, whereas the scenario in which the switch 206 passes outputs from the cross-correlation unit 204 to the second transform unit 210, bypassing the screening unit 208, is referred to as an optimal mode.

The screening unit 208 filters through the outputs of the cross-correlation unit 204 to identify parts of the data received from the mobile station that match the possible ranging codes from the ranging code book. The screening unit 208 forwards the matches to the second transform unit 210, and discards the identification results that do not match. Mathematically, $S=[s(1), s(2), \ldots, s(N)]$ is the cross-correlation vector of the i-th possible ranging code $C_i=[c_i(1), c_i(2), \ldots c_i(N)]$ with the received signal $[r(1), r(2), \ldots, r(N)]$ in the output of the cross-correlation unit 204. A differential operation is performed to S, i.e. $x(n)=s(n+1)s^*(n), n=1, 2, \ldots, N-1$, where $s^*(n)$ is the complex conjugate of $s(n)$. Sum $x(n)$ together to provide $$y = \left| \sum_{n=1}^{N+1} x(n) \right|,$$

and compare y with the predetermined threshold. If y>h, proceed to the second transform unit 210. The second transform unit 210 transforms the outputs from the screening unit 208 with a mathematical algorithm, such as IFFT. Because the number of outputs from the screening unit 208 is reduced, the demands for computing resources by the second transform unit 210 as well as the detection unit 212 are also reduced.

The detection unit 212 receives outputs from the second transform unit 210, and detects the ranging codes for the received data. Various types of information useful for the base station to establish links with the mobile station can be estimated based on the detected ranging codes. For example, the time offset, frequency offset, and the power adjustments of the uplink signals from the mobile station to the base station can be estimated based on the detected ranging codes.

Figure 3:
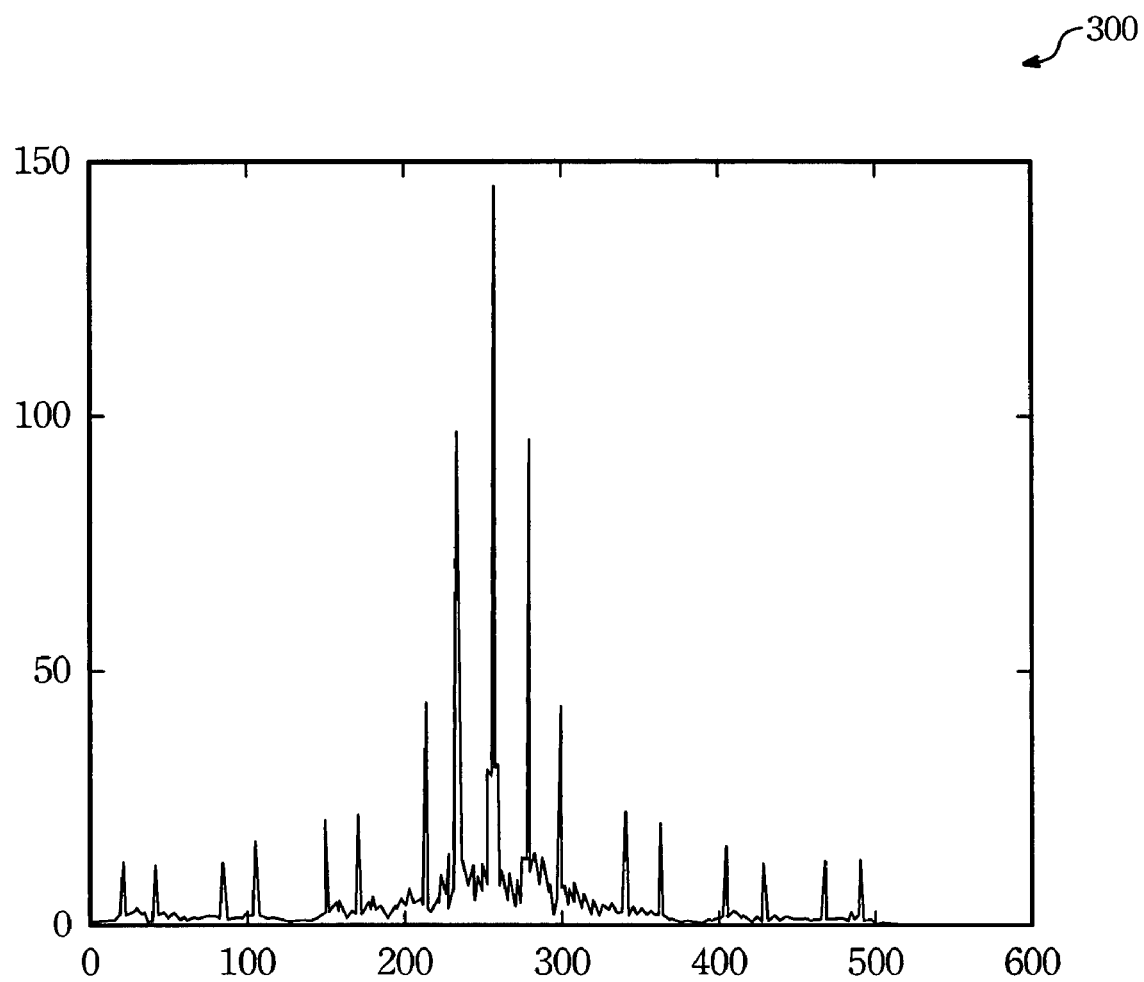
FIG. 3 illustrates a graph showing a signal distribution pattern for a match between received data and particular ranging codes in accordance with one embodiment of the present invention.

In this embodiment, the time offset is estimated by comparing a signal distribution graph plotted based on the outputs from the second transform unit 210 with a set of predetermined signal distribution patterns of the possible ranging codes. Referring to FIG. 3, an exemplary graph 300 is plotted to show a pattern of a particular match for the date received from the base station and one of the possible ranging codes. The graph 300 is shown in the time domain where the x-axis represents time samples and the y-axis represents amplitudes. For each possible ranging code, a pattern as exemplified by the graph 300 can be drawn, and all of the patterns in association with the ranging code book can be compiled in a library. The detection unit 212 (shown in FIG. 2) compares matches of the outputs from the second transform unit 210 (shown in FIG. 2) with the patterns in association with the ranging codes to determine whether and which ranging codes are carried by data received from the mobile station, and determine the time offset based on the pattern that resembles the matches using relative positions of the peaks in the pattern, such as the graph 300.

In the prior art, the time offset is estimated by the peak location of the signal distribution curve. However, the estimated result may not be accurate as the location of the peak on the time line may be affected by noise. In this embodiment, the time offset is determined by relative peak locations in a pattern, thereby eliminating influences of noise and factional sampling offsets. As a result, the accuracy of time estimation is improved.

The detection unit 212 can also detect frequency offsets using the received ranging codes. For example in an Orthogonal Frequency Division Multiplexing (OFDM) system, suppose the OFDM symbol length is N, and ranging signal is transmitted at the first OFDM symbol. Let $[r_j(1), r_j(2), \ldots, r_j(N)]$ be the j-th received OFDM symbol in frequency domain. Suppose the i-th ranging code is detected and the corresponding time offset is $\tau_i$. Steps of estimating the corresponding frequency offset to the i-th ranging code are described as following:

Step 1:

If the time offset $$\tau_i > \frac{N}{2},$$

conduct cross-correlation for $[r_3(1), r_3(2), \ldots, r_3(N)]$ and $[r_2(1), r_2(2), \ldots, r_2(N)]$ with the i-th ranging code $C_i=[c_i(1), c_i(2), \ldots, c_i(N)]$ respectively. The results of cross-correlation are expressed as $S_2=[s_2(1), s_2(2), \ldots, s_2(N)]$, $S_1=[s_1(1), s_1(2), \ldots, s_1(N)]$, with $s_2(n)=r_3(n)c_i^*(n)$, $s_1(n)=r_2(n)c_i^*(n)$.

If the time offset $$\tau_i \leq \frac{N}{2},$$

perform the cross-correlation for $[r_2(1), r_2(2), \ldots, r_2(N)]$, $[r_1(1), r_1(2), \ldots, r_1(N)]$, with the i-th ranging code $C_i=[c_i(1), c_i(2), \ldots, c_i(N)]$ respectively. In the second cross-correlation, a phase rotation is considered for the cyclic prefix structure of initial ranging. The results of cross-correlation are presented as $S_2=[s_2(1) s_2(2), \ldots, s_2(N)]$, $S_1=[s_1(1), s_1(2), \ldots, s_1(N)]$, with $s_2(n)=r_2(n)c_i(n)\exp(jn\phi_0)$, $s_1(n)=r_1(n)c_i(n)$, where $j=\sqrt{-1}$ the value $\phi_0$ depends on the length of cyclic prefix.

Step 2:

Perform the IFFT for $S_2$ and $S_1$, $Z_1$=IFFT($S_1$), $Z_2$=IFFT($S_2$).

Step 3:

$$\text{Calculate phase } \varphi_i = \text{phase}\left(\sum_{n=1}^{N} Z_2(n)Z_1^*(n)\right);$$

or $\phi_i$=phase($Z_2(\tau_i)Z_1^*(\tau_i)$), where $Z_1^*(n)$ is the complex conjugate of $Z_1(n)$.

Step 4:

Based on $\phi_i$ to calculate the frequency offset respect to the i-th ranging code $$f_i = \frac{\varphi_i}{2\pi T_s f_c},$$

where $T_s$ is the duration time of one OFDM symbol, $f_c$ is the system carry frequency.

Figure 4:
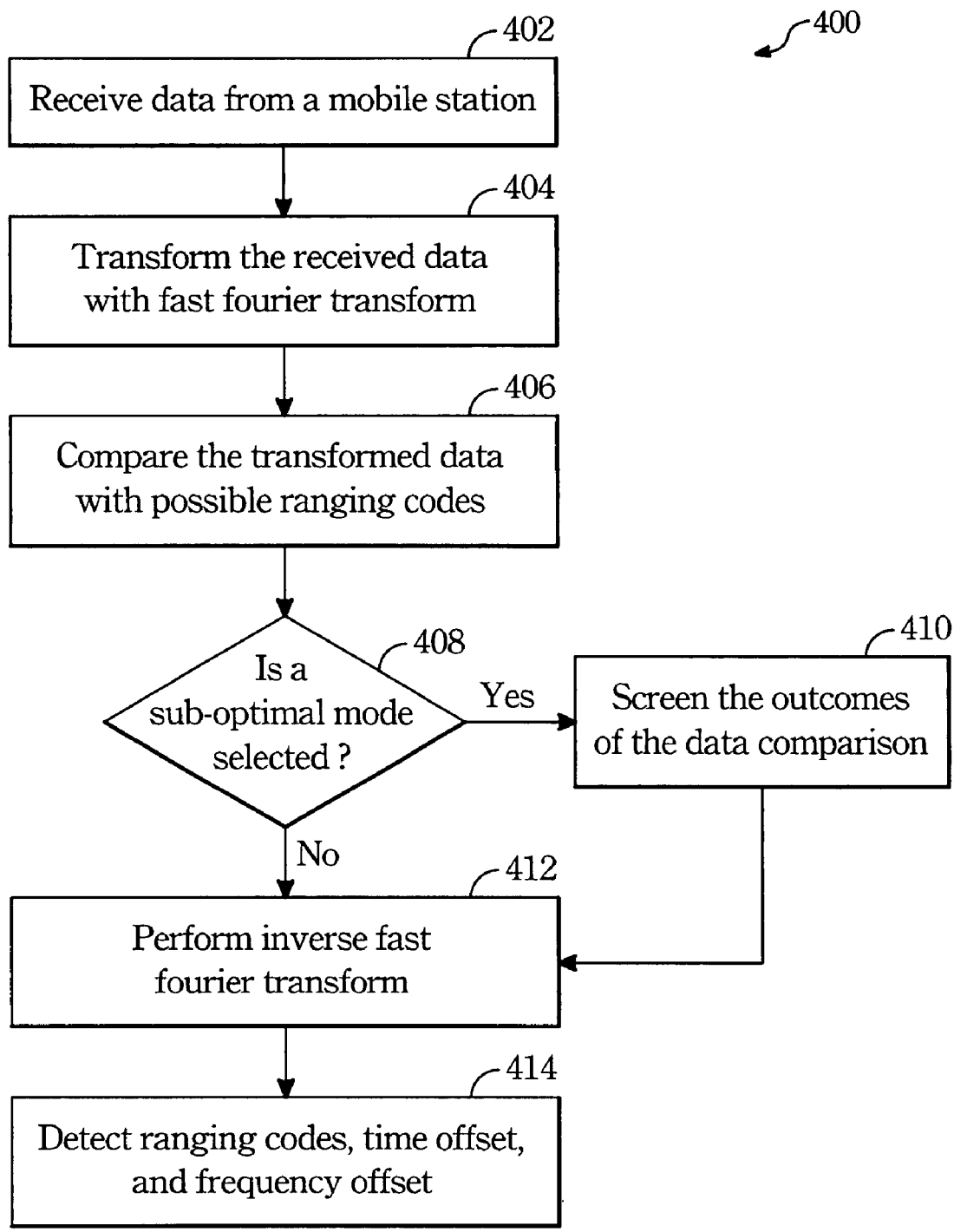
FIG. 4 illustrates a process flow for the apparatus to detect uplink ranging codes in accordance with one embodiment of the present invention.

FIG. 4 illustrates a process flow 400 for the above-described apparatus implemented in a base station to detect uplink ranging codes in accordance with the embodiment of the present invention. At step 402, the apparatus receives data from at least one mobile station seeking to establish uplink channels with the base station. At step 404 the received data are transformed from one domain into another with a mathematical algorithm, such as FFT. At step 406 the transformed data are compared with possible ranging codes using methods, such as cross-correlation, in order to identify the ranging codes carried by the received data. At step 408, a determination whether to switch the apparatus to an optimal or sub-optimal mode is performed based on certain predetermined criteria, such as the size of the ranging code book and the number of the detected ranging codes. If the sub-optimal mode is selected, the process proceeds to step 410 where the results of the data comparison are screened for matches between the transformed data and the possible ranging codes, such that the number of the matches forwarded to step 412 for processing can be reduced, thereby reducing the demand for computing resources of the system. If the sub-optimal mode is not selected, i.e., the optimal mode is activated, the process proceeds to step 412 where all the results of the cross-correlation are transformed back from one domain into another with a mathematical algorithm, such IFFT. The outputs of the transform are then processed for ranging code detection, and time/frequency/power adjustment information estimation, at step 414.

One advantage of the present invention is its flexibility in switching between the sub-optimal and optimal modes. This allows a base station to use its resources more efficiently than that implemented according to the conventional technology when detecting ranging codes. For example, if the ranging code book contains a large number of possible ranging codes, the proposed apparatus will switch to the sub-optimal mode to reduce the demanding for resources in data processing; if the ranging code book contains a small number of possible ranging codes, the proposed apparatus will switch to the optimal mode in order to achieve a more accurate or through result of data processing. Another advantage of the proposed apparatus is that the accuracy of the time offset estimation is improved as it is determined by patterns instead of peak locations.

It is noted that the proposed apparatus is applicable to any distributed frequency domain PN (Pseudo-random Noise) sequences. This includes any preamble, ranging for FDMA (Frequency Division Multiple Access), OFDMA (Orthogonal Frequency Division Multiple Access), and any combination of them, synchronized or unsynchronized, frequency division duplex (FDD) or time division duplex (TDD).

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. An apparatus comprising:
   a first transform unit configured to receive as input data from a mobile station and to perform operations for transforming data received from the mobile station to generate a plurality of first outputs;
   a cross-correlation unit configured to receive the first outputs from the first transform unit and configured to compare the first outputs with possible ranging codes to generate a plurality of second outputs;
   a selective output unit configured to receive the second outputs from the cross-correlation unit and to selectively output portions of the second outputs that match one or more of the ranging codes;
   a second transform unit configured to receive the portions of the second outputs that are output by the selective output unit and to perform operations for transforming the portions of the second outputs to generate a plurality of third outputs; and
   a detection unit configured to receive the third outputs and to detect the ranging codes for the received data based on the third outputs.

2. The apparatus of claim 1, wherein the first transform unit utilizes a Fast Fourier Transform to perform the operations for transforming data received from the mobile station.

3. The apparatus of claim 1, wherein the second transform unit utilizes an Inverse Fast Fourier Transform to perform the operations for transforming the received portions of the second outputs.

4. The apparatus of claim 1, further comprising a switch coupled to the cross-correlation unit and configured to selectively supply the second outputs to the second transform unit or to the selective output unit depending on whether one or more predetermined criteria are met, such that when the one or more predetermined criteria are met the switch supplies the second outputs to the second transform unit and bypasses the selective output unit.

5. The apparatus of claim 4, wherein the switch is configured to supply the second outputs to the second transform unit and to bypass the selective output unit when a ranging code book providing the possible ranging codes has a size smaller than a predefined value.

6. The apparatus of claim 4, wherein the switch outputs the second outputs to the selective output unit when the number of ranging codes detected by the detection unit is smaller than a predetermined threshold.

7. The apparatus of claim 1, wherein the detection unit is further configured to estimate a time offset of the data received from the mobile station.

8. The apparatus of claim 7, wherein the detection unit estimates the time offset by comparing the third outputs from the second transform unit with a set of predetermined signal distribution patterns of the possible ranging codes and by determining peak locations of the distribution patterns.

9. The apparatus of claim 1, wherein the detection unit is further configured to estimate a frequency offset of the data received from the mobile station.

10. The apparatus of claim 1 wherein the detection unit is further configured to acquire power adjustment information of uplink signals associated with the mobile station based on the detected ranging codes.

11. The apparatus of claim 1, wherein the selective output unit is configured to selectively output portions of the second outputs that match one or more of the ranging codes such that computing demands for the second transform unit are reduced.

12. A method comprising:
at a base station, receiving data from a mobile station;
first transforming the data received from the mobile station with a Fast Fourier Transform to generate a plurality of first outputs;
comparing the first outputs with possible ranging codes to generate a plurality of second outputs;
selectively outputting portions of the second outputs that match one or more of the possible ranging codes, when a predetermined criterion is met;
second transforming the portions of the second outputs with an Inverse Fast Fourier Transform to generate a plurality of third outputs; and
detecting the ranging codes for the received data based on the third outputs.

13. The method of claim 12, wherein selectively outputting portions of the second outputs is not performed when the predetermined criterion is not met.

14. The method of claim 13, wherein the second transforming comprises transforming the portions of the second outputs when a ranging code book providing the possible ranging codes has a size larger than a predefined value.

15. The method of claim 13, wherein second transforming comprises transforming the portions of the second outputs when a number of the portions of the second outputs that match the ranging codes is smaller than a predetermined threshold.

16. The method of claim 12, further comprising estimating a time offset of the data received from the mobile station.

17. The method of claim 16, wherein estimating comprises estimating the time offset by comparing the third outputs with a set of predetermined signal distribution patterns of the possible ranging codes and by determining peak locations of the distribution patterns.

18. The method of claim 12, further comprising estimating a frequency offset of the data received from the mobile station.

19. The method of claim 12, further comprising acquiring power adjustment information of uplink signals associated with the mobile station based on the detected ranging codes.

20. The method of claim 12, wherein selectively outputting comprises outputting portions of the second outputs that match one or more of the ranging codes such that computing demands are reduced for the second transforming of the portions of the second outputs.

* * * * *